United States Patent [19]
Wilson

[11] Patent Number: 5,713,267
[45] Date of Patent: Feb. 3, 1998

[54] COOKING DEVICE

[76] Inventor: Justin E. Wilson, P.O. Box 121, Summit, Miss. 39666

[21] Appl. No.: 702,240

[22] Filed: Aug. 27, 1996

[51] Int. Cl.⁶ .................................................. A23B 4/044
[52] U.S. Cl. ............................ 99/482; 99/331; 99/447
[58] Field of Search .......................... 99/331, 401, 447, 99/482, 467, 473, 474, 480; 219/386, 387, 388, 395, 399, 400; 126/21 A, 21 R, 39 R, 275 E

[56] References Cited

U.S. PATENT DOCUMENTS

| | | |
|---|---|---|
| 1,492,892 | 5/1924 | Muse . |
| 2,833,201 | 5/1958 | Simank ................................. 99/482 |
| 2,985,097 | 5/1961 | Nevin et al. ......................... 99/447 |
| 3,041,959 | 7/1962 | Oyler ................................... 99/482 |
| 3,266,409 | 8/1966 | Oyler ................................... 99/482 |
| 3,364,912 | 1/1968 | Dills et al. ........................ 126/21 A |
| 4,130,052 | 12/1978 | Jacobson ............................. 99/339 |
| 4,232,597 | 11/1980 | Perrine ................................ 99/468 |
| 4,355,570 | 10/1982 | Martin et al. ....................... 99/446 |
| 4,392,419 | 7/1983 | Bonny .................................. 99/339 |
| 4,474,107 | 10/1984 | Cothran ............................... 99/352 |
| 4,669,447 | 6/1987 | Kelly ................................... 426/314 |
| 4,750,469 | 6/1988 | Biggs ................................ 99/447 X |

*Primary Examiner*—Reginald L. Alexander
*Attorney, Agent, or Firm*—Domingue, Delaune & Waddell

[57] ABSTRACT

A novel cooking device is disclosed. The cooking device includes a container having a top portion and a bottom portion. A heating element is included, with the heating element being adapted to the bottom portion of the container for generating an electric heat source. The cooking device also comprises a cover plate for the electric heat elements, with the cover plate having selectively opening passages for allowing the electric heat to be channeled into the device. The device further comprises a valve member adapted for allowing the release of the generated heat source at the option of the operator, and a fire box container adapted to the inlet of the container. A wood heat source is contained within the fire box container for generating a heat source. A plate member is positioned above the heating elements so that a wood heat source chamber is formed.

9 Claims, 5 Drawing Sheets

COOKING DEVICE

BACKGROUND OF THE INVENTION

This invention relates to a novel cooking device. More particularly, but not by way of limitation, this device relates to a cooking device that may be used as a broiler, smoker, and/or pressure cooker.

A popular method of meal preparation has been to grill a cut of meat utilizing a burning wood, such as hickory or mesquite. The wood thus burned imparts a unique and highly desirable flavor. The device employed may be an open-flame type of pit, or a closed container such as an oven. The prior art devices also include electrical heat sources and/or natural gas sources.

However, due to weather conditions, an open pit is not always desirable. Also, the chef may want portability so that the cooking may be done at a restaurant, home, and/or remote location. In order for portability, the cooking device must be compact. Further, the chef may want the option of utilizing a wooden heat source in combination with electrical means such as used in ovens.

The prior art devices do not allow for portability for a device that may be used as a smoker and/or oven. Further, the prior art devices do not allow for the pressurized cooking of meat with the same device. Also, as those of ordinary skill in the art will appreciate, the flow of the generated heat, as well as the containment of the smoke and pressure is critical for quality products. Therefore, there is a need for a cooking device that can be used as a smoker, pressure cooker, and oven. Further, there is a need for the above described cooking device that is portable, but also produces quality cooked meals.

SUMMARY OF THE INVENTION

A novel cooking device is disclosed. The cooking device includes a container having a top portion and a bottom portion, with the bottom portion having an inlet. A heating element is included, with the heating element being adapted to the bottom portion of the container for generating an electric heat source and generating a first pressure source. The cooking device also comprises a cover plate for the electric heat elements, with the cover plate having selectively opening passages for allowing the electric heat to be channeled into the device.

The device further comprises a valve means, operatively associated with the outlet, for allowing the release of the generated heat source at the option of the operator. In the preferred embodiment, the valve means contains a variable opening position for controlling the amount of the generated heat source and pressure to be released.

The cooking device will include a fire box container adapted to the inlet of the container. A wood heat source is contained within the fire box container for generating a heat source. It should be noted that this heat source also generates a second pressure. A plate member is positioned above the heating elements so that a wood heat source chamber is formed. Thus, the plate member channels the generated heat source into the wood heat source chamber. The wood heat source chamber will have an opening opposite the fire box container for allowing the generated heat source into the container.

In the preferred embodiment, the cooking device will further contain a thermometer member, operatively associated with the container, adapted for measuring the temperature inside the container and energizing the electric heat elements based on temperature inside the container. The cooking device may further include a first slidable tray operatively positioned within the container, and a second slidable tray operatively positioned within the container, with the first and second slidable tray being mounted above and parallel to the electric elements. The first and second tray may be constructed with a screen means for allowing the generated heat to circulate therethrough.

In one embodiment of the invention, the heating elements will have placed thereon wood chips so that the heating element burns the wood chips to generate a second wood heat source. Also, in the preferred embodiment, the cover plate is selectively detachable from the electric heat element and the device further comprises a wood chip screen operatively associated with the electric heat element. Further, in the preferred embodiment, the container is enclosed with an insulation material so that the generated heat and pressure is contained within the container.

An advantage of the present invention includes use of the device as either broiler, baker, pressure cooker, or griller. Another advantage includes the device is portable, and therefore, may be moved from one location to another with a minimum of effort. Another advantage is that the device may be used exclusively for wood burning, or exclusively for electric grilling, or both.

Yet another advantage is that wood chips may be placed within the fire box or on electric elements. Another advantage is the operator has the option of directing heat flow (and the corresponding smoke flow) within the container. Still yet another advantage is that the device allows for alternate paths of the electric heat flow within the container.

Still yet another advantage is that if the operator loses electrical power, he may still cook by using wood burning in the fire box. Another advantage includes use of multiple trays within the container, for instance one for meat, one for drippings, and/or another for a water pan. Yet another advantage is the device may be thermostatically controlled.

BRIEF DESCRIPTION OF THE PREFERRED EMBODIMENTS

DESCRIPTION OF THE PREFERRED EMBODIMENTS

Figure 1:
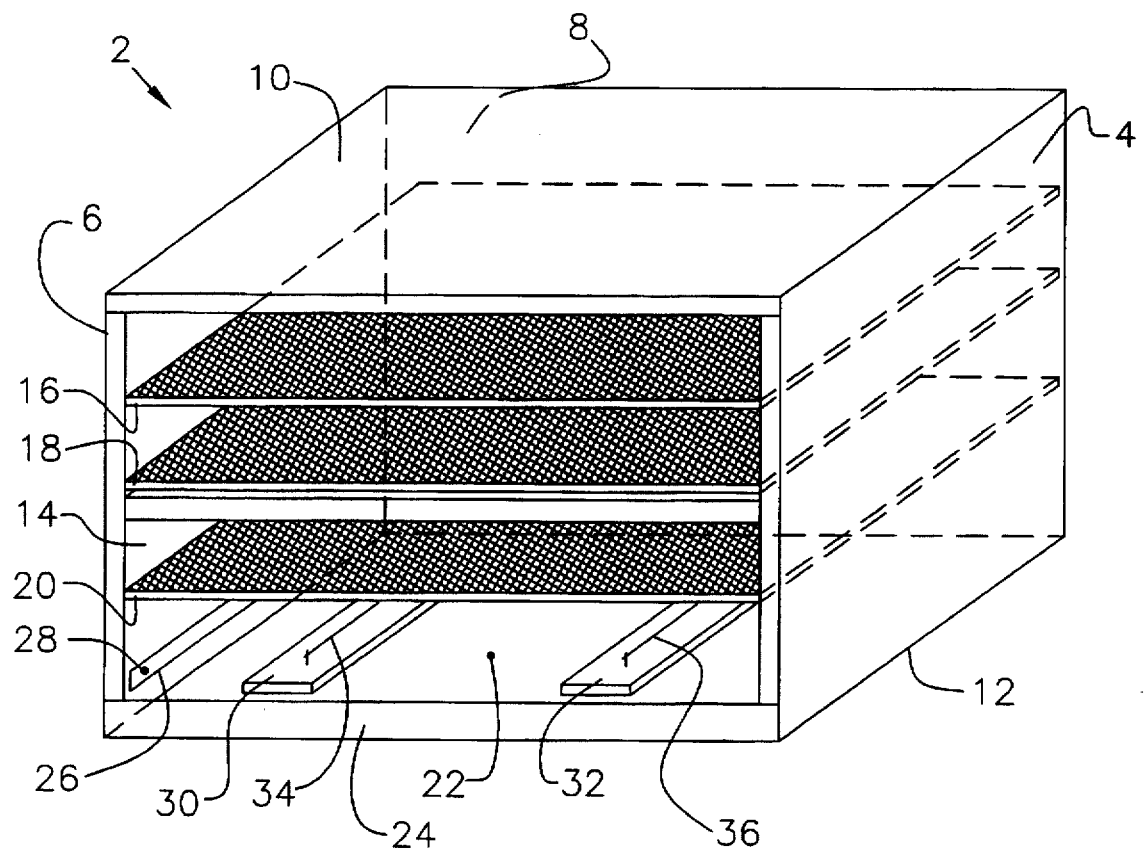
FIG. 1 is an elevation view of an embodiment of the present invention.

Referring now to FIG. 1, an elevation view of an embodiment of the present invention will now be described. The cooking device 2 will generally comprise a rectangular box having sides 4, 6, 8, a top portion 10 and a bottom portion 12. As seen in FIG. 1, the front side 14 will comprise two hinged doors that will be better explained in FIG. 2. In the preferred embodiment, the sides 4–8, top 10 and bottom 12 are constructed of ⅛" flat steel plate.

The cooking device 2 will have in the preferred embodiment a first slidable tray 16, a second slidable tray 18, and a third slidable tray 20. The trays 16, 18, and 20 may be slide in and out of the cooking device 2 as is necessary to place the food on the trays as well as checking on the progress of the cooking. The tray 20 may be used to place a drip pan means for collecting drippings from the cooking meat, or the chef may place a pan of water on the tray 20 to provide moisture within the device 2.

The cooking device 2 will have the previously mentioned bottom portion 12 which comprises a lift out bottom plate 22. The lift out bottom plate 22 will have operatively associated therewith electric heating element means for generating a heat source with the device 2 as will be more fully set out later in the application. The lift out bottom plate 22 extends above the bottom portion 12 so that a wood heat source chamber 24 is formed, with the lift out bottom plate 22 concluding at the end 26 which in turn creates a slot 28 for passage of the wood heat source.

The lift out bottom plate 22 will also have associated therewith a pair of lift out covers 30, 32 for covering the electrical heating elements. As seen in FIG. 1, the lift out cover 30 is a rectangular box shaped cover that has sides as well as a top portion that has handle members 34, 36. As will be more fully set out, the preferred embodiment contains two electrical heating elements.

Figure 2:
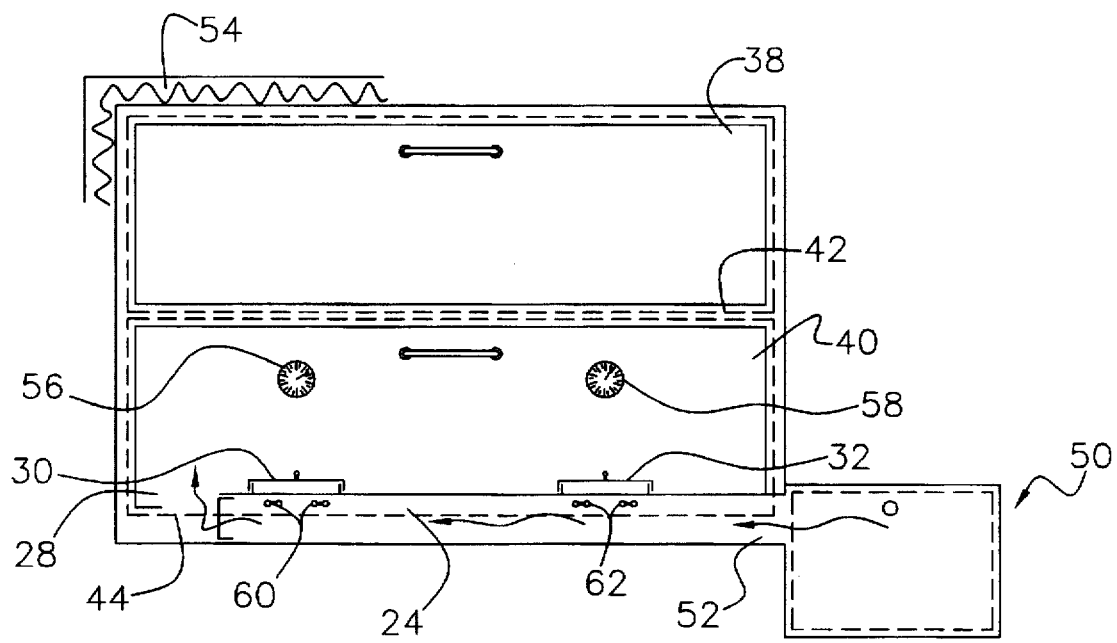
FIG. 2 is a front view of the preferred embodiment of the invention depicting the heat chamber and cover members.

Referring now to FIG. 2, a front view of the preferred embodiment of the invention depicting the wood heat chamber 24 and door members 38 and 40 is shown. It should be noted that identical numbers throughout the various figures refer to like components. The door members 38, 40 are doors hinged at point 42, 44, with the handles 46, 48 being operatively associated therewith.

In the preferred embodiment, the cooking device 2 will have adapted at one end the fire box container 50, with the fire box container 50 being connected to an inlet 52 that allows the heat and smoke generated within the fire box 50 to be channelled into the device via the wood heat source chamber 24. Thus, the heat and smoke would travel through the wood heat source chamber 24 and up into the passage 28 which in turn allows the heat and smoke into the cooking device 2.

FIG. 2 also depicts the cooking device 2 being insulated with a 2300 degree Fahrenheit heat insulation wrap 54. A pair of thermometers 56 and 58 is included, with the thermometer 56 being operatively associated, and controlling, the electric heating element 60. The thermometer 58 is operatively associated, and controlling, the electric heating element 62.

Figure 3:
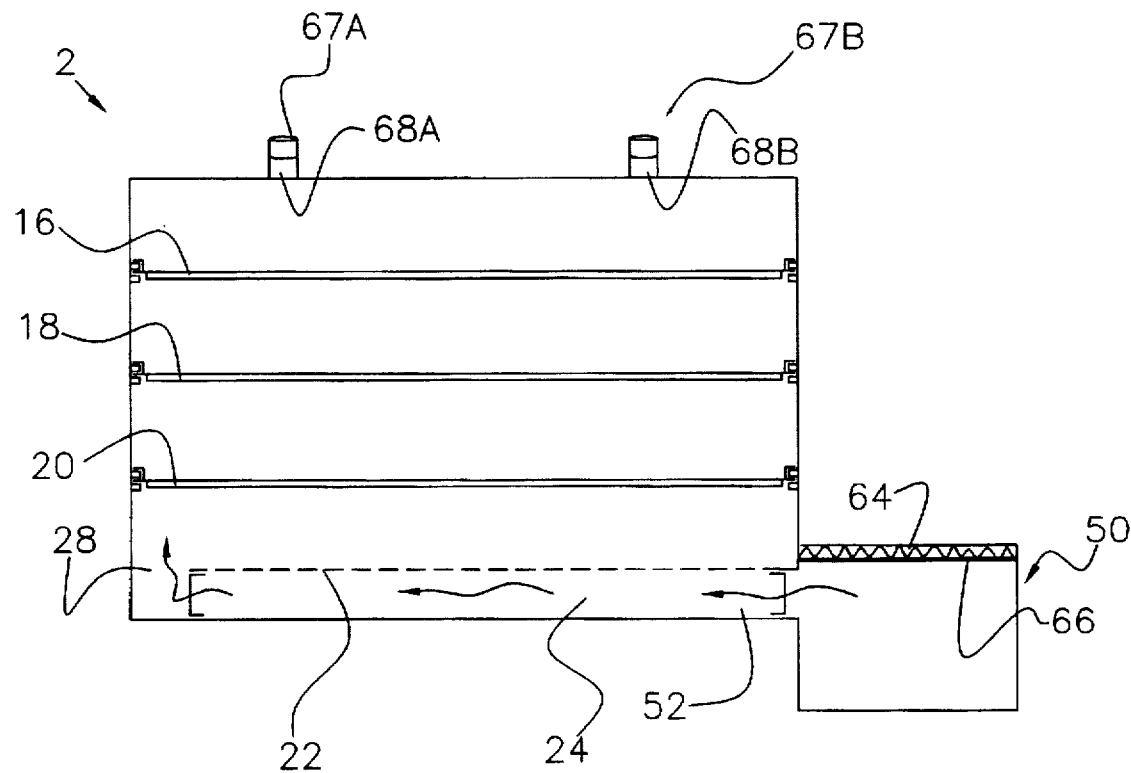
FIG. 3 is another front view of the embodiment of FIG. 2 depicting the heat chamber, fire box and slidable trays.

Referring now to FIG. 3, another front view of the embodiment of FIG. 2 depicting the heat chamber 24, fire box 50 and slidable trays 16, 18 and 20. In the preferred embodiment, the planar trays 16, 18, 20 will be constructed of a porous material, such as a screen, so that the heat generated from the fire box 50 and the heating elements 60, 62 may be channelled upward through the meat contained on said trays 16, 18, and 20 in accordance with the teachings of the present invention. It should also be noted that the fire box container may also contain a heat insulation wrap 64. The surface 66 may be used as a hot plate surface due to the heat generated within said fire box 50.

FIG. 3 also depicts the valve means 67A and 67B, operatively associated with the outlets 68A and 68B, for allowing the release of the generated heat source and pressure. In the preferred embodiment, the valve means 67A and 67B have a variable opening position for controlling the amount of the generated heat source and pressure released. In other words, the valve means 67A, 67B may be completely closed so that the cooking device is converted into a pressure cooker. Alternatively, the valve means 67A, 67B may be completely opened. However, if the chef desires, the valve means 67A, 67B may be only partially opened so that the heat and smoke is released very slowly (thereby allowing more saturation and penetration of the heat and smoke into the meat).

Figure 4:
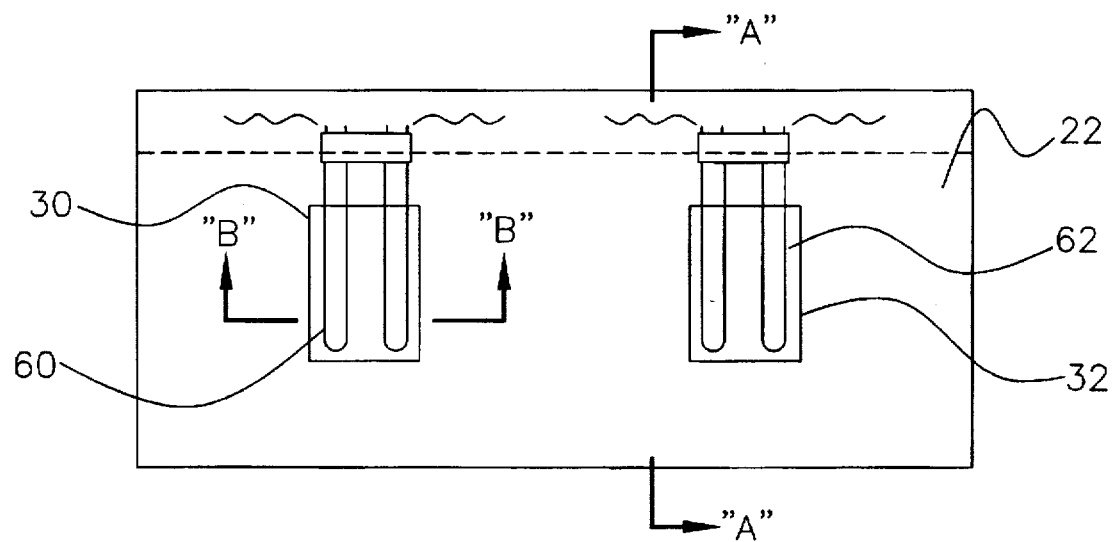
FIG. 4 is a plan view of the cover member with heating elements.

As seen in FIG. 4, and as noted earlier, the cooking device contains two heating elements, namely 60, 62, that are positioned below the lift out plate 22. The heating elements 60, 62 are positioned below the lift out bottom plate 22 with the lift out covers 30, 32 being placed above as previously set out.

Figure 5:
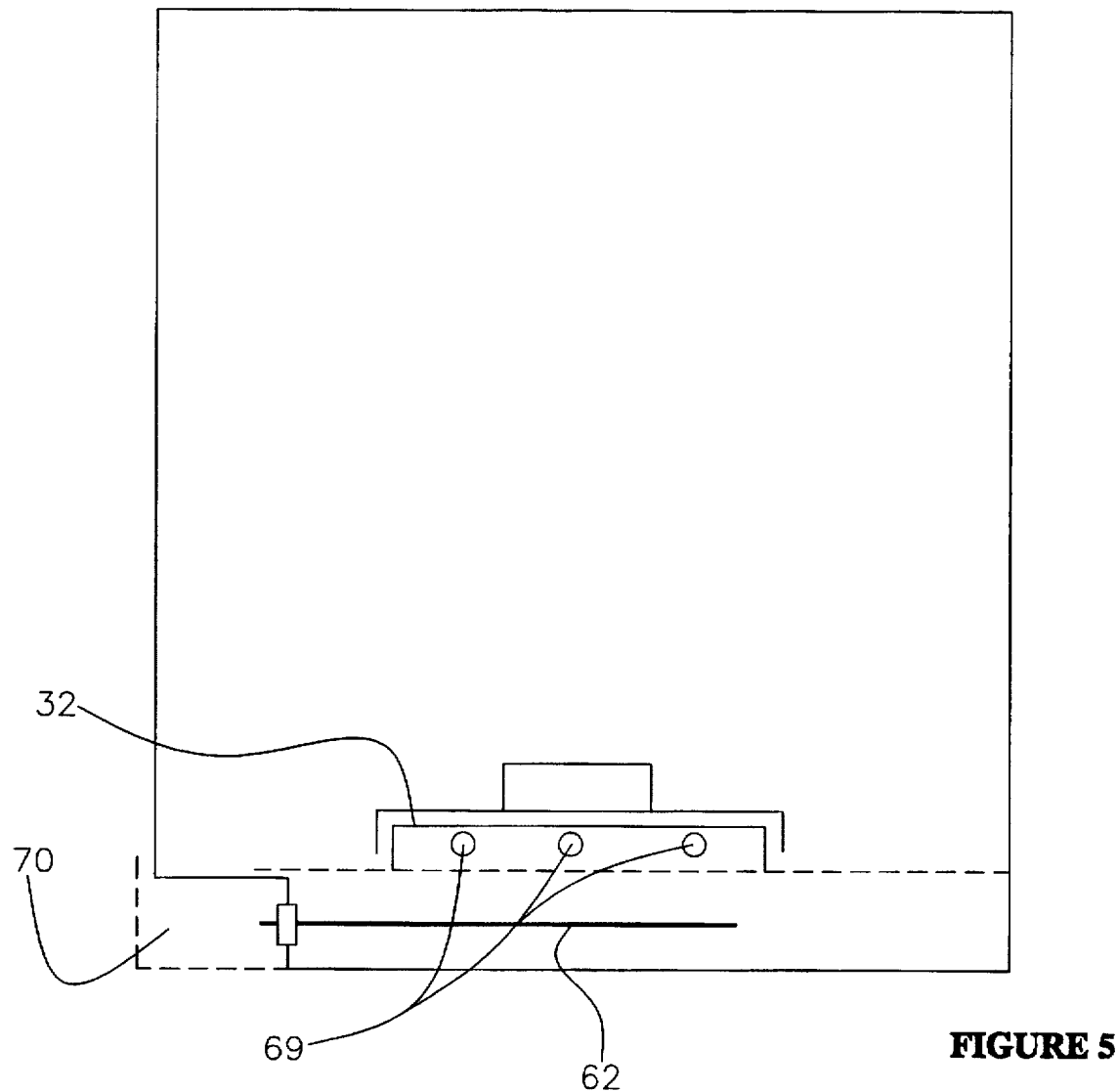
FIG. 5 is a sectional view of cover member with heating elements taken along line A—A of FIG. 4.

The FIG. 5 depicts a sectional view of the lift out cover member 32 with heating elements taken along line A—A of FIG. 4. The lift out cover 32 has associated therewith the handle 36. The lift out cover 32 also has a selective heat passage means 68 for selectively allowing the passage of the heat which has been generated by the heating element 62. The selective passage 68 may be achieved by having a rectangular plate with holes therein slidable mounted to match-up with the openings of the lift cover 32. As shown, the heating element 62 is attached to the wiring compartment 70 for appropriate electrical connection to the electrical source.

Figure 6:
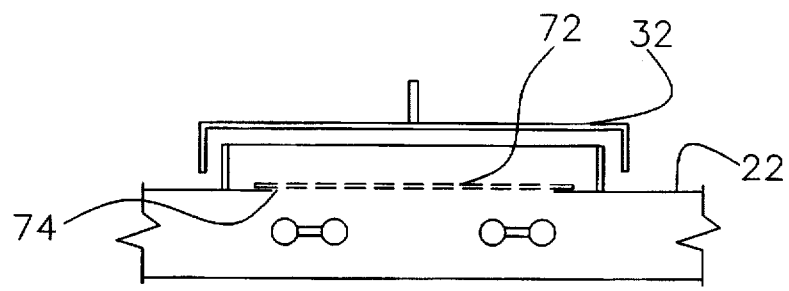
FIG. 6 is a sectional view of cover member with heating elements taken along line B—B of FIG. 4.

FIG. 6 depicts a sectional view of cover member with heating elements taken along line B—B of FIG. 4. The embodiment of FIG. 6 depicts the lift out cover 32 and lift out plate 22, and electrical heating element 62. This embodiment depicts a screen 72 that is placed above the opening 74 in the lift out plate 22. With the screen 72 in place, the lift out cover 32 may be removed, and wood chips placed on the screen 72. The heat generated from the electrical heating elements will cause the wood chips to burn.

In operation, the chef will decide whether he wishes a combination of wood burning (within the fire box 50) and electric heat (generated by said heating elements 60, 62). Remember, the chef has the following heat source options: both wood burning via the fire box 50 and heating elements; only the fire box 50; only the heating elements 60, 62; only the heating elements 60, 62 with wood chips placed directly thereon. Further, the chef may direct the heat through the selective heat passages 68. Moreover, the chef may utilize the valve means 67A, 67B for allowing the release of the generated heat, pressure and/or smoke within the cooking device 2 in order to pressure cook the meat or to variably open the valve means 67A, 67B so as to saturate and penetrate the meat with smoke and heat. Thus, the present invention includes use of the device 2 as either broiler, baker, pressure cooker, and/or griller.

Changes and modifications in the specifically described embodiments can be carried out without departing from the scope of the invention which is intended to be limited only by the scope of the appended claims.

I claim:

1. An apparatus for cooking comprising:

a cooking container having a top portion and a bottom portion, with top portion containing an outlet and the bottom portion having an inlet;

electric heating element means, operatively attached to said bottom portion of said cooking container, for generating an electrical heat within said cooking container;

a fire box container, operatively attached to said cooking container;

a wooden heat generating means for generating a wooden heat;

electric heating element channeling means, operatively associated with said cooking container, for channeling said electrical heat in said cooking container;

fire box channeling means, operatively associated with said inlet, for channeling said wooden heat into said cooking container; and, wherein said fire box channeling means directs said wooden heat under electric elements and wherein said container has a first side corresponding with said inlet and a second side, and wherein said wooden heat is delivered to the second side of said container, and wherein said electric heating element channeling means comprises a cover plate member with a opening therein, with the opening oriented so that said electrical heat is directed above said electric heating elements and in a perpendicular direction relative to said fire box channeling means;

valve means, operatively associated with said outlet, for allowing the release of said wooden heat and said electrical heat, said valve means having a variable opening position for controlling the amount of said wooden heat and said electrical heat being released;

a thermometer operatively associated with said cooking container; and, a thermometer control means, operatively associated with said electric heat elements, for energizing said electric heat elements based on the temperature measured by said thermometer within said container.

2. The apparatus of claim 1 wherein said container contains a first slidable tray and a second slidable tray, with said first and second slidable tray being mounted parallel with said electric elements, and wherein said first and second tray is constructed with a screen means for allowing the heat generated to circulate therethrough.

3. The apparatus of claim 2 wherein said electric heating element means has placed thereon wood chips, and wherein said electric heating element means burns said wood chips.

4. A cooking device comprising:

a container having a top portion and a bottom portion, with the bottom portion having an inlet and said top portion having an outlet;

a heating element adapted to said bottom portion of said container for generating an electrical heat within said container, said electric heat generating a first pressure source within said container;

a cover plate for said electric heat element, said cover plate containing a selectively opening passage for allowing the electrical heat into said container;

valve means, operatively associated with said outlet, for allowing the release of said generated electrical heat and said first pressure source from said container, said valve means having a variable opening position for controlling the amount of said generated electrical heat and said first pressure source released from said container;

a fire box container adapted to said inlet of said container;

a wood heat source contained within said fire box container for generating a wooden heat within said container, said wood heat source generating a second pressure source;

a plate member positioned above said heating elements so that a wood heat source chamber is formed, and wherein said plate member channels said generated wooden heat into said wood heat source chamber, said wood heat source chamber having an opening opposite said fire box container for allowing said generated wooden heat into said container; and wherein said valve means also allows for release of said generated wooden heat and said second pressure source.

5. The cooking device of claim 4 further containing:

a thermometer operatively associated within said container;

a control member, operatively associated with said electric heat elements, adapted for energizing said electric heat elements based on said generated wooden heat and said electrical heat measured by said thermometer.

6. The cooking device of claim 5 further comprising:

a first slidable tray operatively positioned within said container; and, a second slidable tray operatively positioned within said container, with said first and second slidable tray being mounted parallel with said electric elements, and wherein said first and second tray is constructed with a screen means for allowing the generated heat to circulate therethrough.

7. The device of claim 6 wherein said heating element has placed thereon wood chips, and wherein said heating element burns said wood chips to generate a second wooden heat.

8. The device of claim 7 wherein said cover plate is selectively detachable from said electric heat element and wherein the device further comprises a wood chip screen operatively associated with said electric heat element.

9. The device of claim 8 wherein said container is enclosed with an insulation material so that said generated wooden heat, electrical heat, first pressure source and said second pressure source is contained within said container.

* * * * *